United States Patent [19]

Zabel et al.

[11] Patent Number: 5,706,341
[45] Date of Patent: Jan. 6, 1998

[54] ACTIVE DIGIT CANCELLING PARALLEL DIALER

[75] Inventors: John R. Zabel, Canton; James E. Neil, Ogdensburg, both of N.Y.

[73] Assignee: Mitel, Inc., Reston, Va.

[21] Appl. No.: 366,668

[22] Filed: Dec. 30, 1994

(Under 37 CFR 1.47)

[51] Int. Cl.⁶ ........................................... H04M 1/50
[52] U.S. Cl. .................... 379/361; 379/130; 379/200; 379/283; 379/355
[58] Field of Search .......................... 379/361, 355, 379/354, 386, 351, 283, 189, 200, 130, 199, 221

[56] References Cited

U.S. PATENT DOCUMENTS

| | | | |
|---|---|---|---|
| 4,776,008 | 10/1988 | Ohkoshi | 379/350 |
| 4,939,470 | 7/1990 | Kang | 379/361 |
| 4,998,276 | 3/1991 | Hasegawa | 379/361 |
| 5,027,389 | 6/1991 | Chiue et al. | 379/371 |
| 5,440,622 | 8/1995 | Yuki | 379/200 |
| 5,535,265 | 7/1996 | Suwandhaputra | 379/200 |
| 5,559,874 | 9/1996 | Panosh | 379/200 |
| 5,590,182 | 12/1996 | Stevens et al. | 379/200 |

*Primary Examiner*—Jack K. Chiang
*Assistant Examiner*—Jacques M. Saint-Surin
*Attorney, Agent, or Firm*—Laff, Whitesel, Conte & Saret, Ltd.

[57] ABSTRACT

A method of dialing digits using dual tone multifrequency (DTMF) signals comprised of generating a digit from a DTMF generator comprised of a first pair of signals forming a DTMF signal, one signal of the first pair of signals being in a low frequency band and one signal of the first pair of signals being in a high frequency band, and applying the DTMF signal to a telephone line connected to a central office, detecting the first pair of signals in an auxiliary circuit and immediately applying a third signal in either of the low or high bands to the telephone line at the same time as the first pair of signals, and detecting the presence of the pair of signals and the third signal at the central office and preventing processing of the DTMF signal at the central office as a result thereof.

9 Claims, 1 Drawing Sheet

5,706,341

ACTIVE DIGIT CANCELLING PARALLEL DIALER

FIELD OF THE INVENTION

This invention relates to the field of telephony, and in particular to an automatic dialer.

BACKGROUND TO THE INVENTION

Automatic dialers are used in parallel with a telephone line to provide ancillary dialing capabilities to a user. For example, a user might prefix a long distance call with the digit 1, then dial a long distance number. A parallel dialer would recognize the dialed digit 1, then immediately dial a sequence that would identify an alternate long distance communication supplier before the first digit of the long distance number is dialed. After the long distance number is keyed, the dialer dials a suffix sequence of numbers which identify the user to the alternate long distance communication supplier.

It will be recognized that all digits dialed by the user are recognized by the telephone system central office. Every digit received by the central office is used for processing the call. Thus a dialer could not be used to provide a store and forward function because any digit generated by the user will be received and processed by the central office. If digits were initially sent by the dialer to provide routing information, the central office would remove dialtone and enter an addressing state. Since the central office provides no way of deleting digits that it receives, it is not possible to perform a line drop and reseize operation when the dialer is used in parallel with the subscriber's line, which is the usual condition.

SUMMARY OF THE INVENTION

The present invention is a dialing apparatus and method for providing the ability to the subscriber of dialing one or a sequence of digits, which are ignored by the central office, and which can be received by a dialer, analyzed for a purpose such as routing, then generate a substitute sequence of digits which will be received by the central office and result in the processing of a call in response thereto. This allows the dialing of unusual characters such as a computer back-space character which would not be normally recognized by the central office, and the substitution by the dialer of a digit or analogous character or sequence that would be recognized by the central office. Keyboards or other input devices different from the usual telephone keypad can thus be used to dial digits and use specialized keys to generate dialing sequences which can be recognized and used by the dialer but which would otherwise not be recognized by the central office or which would be recognized but would cause erroneous call processing to occur.

Central office line circuits detect dual tone multifrequency (DTMF) signals as dialed digits. One of the significant characteristics of a DTMF signal is that it is formed of two tones, one in a defined high frequency band and one in a defined low frequency band. From time to time a careless user may depress more than one telephone keypad button in attempting to key one digit, and this could result in more than two signals being generated. Central office line circuits are designed to reject signals which have more than one signal in the high band at the same time as more than signal in the low band. This is made use of in the present invention whereby a third tone is added to the DTMF signal by the dialer, causing the central office to ignore or prevent reception of the DTMF signal.

A DTMF signal is comprised of a pair of tones, one tone from a group of four possible tones in a low frequency band, and second tone from a group of four possible tones in a high frequency band. In conventional subscriber telephone sets, only three of the tones in the high band are used. However, line circuits of the central office are designed to detect all eight tone frequencies. The frequency typically not used by the telephone set is at 1633 Hz, and that is the frequency of the third tone preferred to be generated by the dialer (or other auxiliary circuit used). However, the third tone can be of any audio frequency as long as it can be recognized by the central office and cause rejection of the dialed DTMF if the third tone is present.

Central offices require the presence of a valid pair of tones to be present, one in the high band and one in the low band, and that the level of any third tone present within the voice band should be lower in amplitude than that of the two desired tones, by some fixed ratio in order that the valid pair of tones should be recognized as a DTMF digit. In the present invention and in the description herein, it is intended that the term "third tone" or "third signal" means a signal which is not lower in amplitude than that of the two desired tones by some fixed ratio. Thus in the presence of the third signal, the pair of tones that would otherwise be considered by the central office as a valid DTMF digit, is considered not to be valid.

In accordance with an embodiment of the invention, a method of dialing digits in a dialer is comprised of receiving first DTMF signals from a telephone line, generating a third signal and applying it simultaneously with the DTMF signals to the telephone line, and subsequently generating and applying a substitute DTMF signal sequence to the telephone line.

In accordance with another embodiment, a method of dialing digits using dual tone multifrequency (DTMF) signals is comprised of generating a digit from a DTMF generator, which digit is comprised of a first pair of signals forming a DTMF signal, one signal of the first pair of signals being in a low frequency band and one signal of the first pair of signals being in a high frequency band, and applying the DTMF signal to a telephone line connected to a central office, and detecting the first pair of signals in an auxiliary circuit and immediately applying a third signal in either of the low or high bands to the telephone line at the same time as the first pair of signals, and detecting the presence of the pair of signals and the third signal at the central office and preventing processing of the DTMF signal at the central office as a result thereof.

In accordance with another embodiment, a dialer is comprised of apparatus for receiving DTMF signals from a telephone line, apparatus for generating a third signal and applying it simultaneously with the DTMF signals to the telephone line, and apparatus for generating and applying a substitute sequence of DTMF signals to the telephone line following receipt of a predetermined sequence of DTMF signals from the telephone line.

In accordance with another embodiment, a telephone dialer is comprised of apparatus for generating DTMF signals comprised of pairs of signals, one signal of each pair being in a respective high and low band, apparatus for generating a third signal, apparatus for applying the DTMF signals and the third signal to a telephone line, apparatus for controlling both the generating apparatus, apparatus for receiving incoming pairs of signals from the telephone line, each pair designating a DTMF digit, one incoming signal of each pair being n a low band and one incoming signal of each pair being in a high band, apparatus for blocking the third signal from being received, and apparatus for translating the incoming pairs of signals and applying a resulting signal to the controlling means, whereby the controlling means is enabled to control the generation of the third signal during receipt of the incoming pairs of signals and the generation of substitute DTMF signals following the completion of receipt of a sequence of the incoming pairs of signals.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
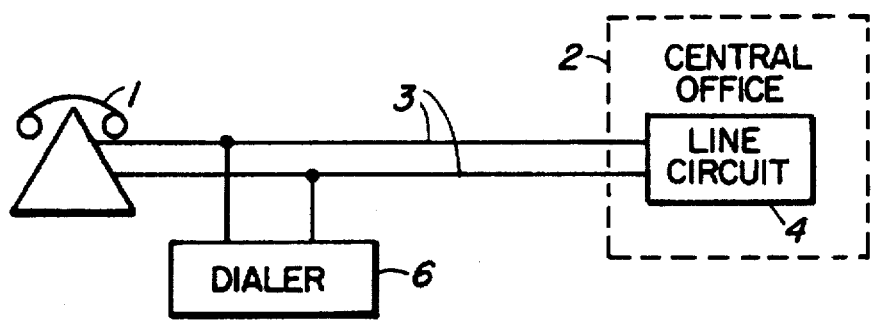
FIG. 1 is a block diagram of a subscriber's line with a parallel dialer.

FIG. 1 illustrates a telephone set 1, which is connected to a central office 2 via a subscriber's line 3. The subscriber's line is connected to a line circuit 4 in the central office in a well known manner. A dialer 6 is also connected in parallel with the subscriber's line.

Figure 2:
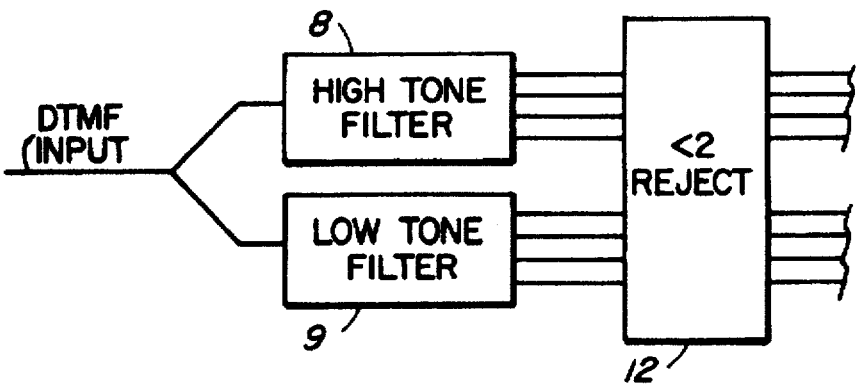
FIG. 2 is a block diagram of part of a line circuit at a central office.

Normally DTMF dialing digits from both the telephone set and the dialer are carried by the subscriber's line to the line circuit of the central office. The line circuit contains high tone filters 8 and low tone filters 9, as shown in FIG. 2. Four lines at the outputs of each of the filters designate the presence of a signal in the high band and a signal in the low band, a mark being carried on one line of each group of four lines. A circuit connected to those lines decodes which signals are present, and thus the value of the DTMF digit designated thereby.

If more than one signal is detected in each of the bands which is not lower than a predetermined ratio of the amplitudes of the pairs of signals, the pair of signals, or the marks designating the presence of a valid DTMF signal is prevented from being passed through to further processing circuitry of the central office. This is illustrated by the block >2 reject, carrying reference numeral 12. In case the central office does not contain circuitry to reject more than two simultaneous signals, more than one in one band and at least one in the other, it should be added to the central office line circuit or to circuitry receiving the output signal therefrom. Such circuitry can alternatively take the form of a signal gate which inhibits the received or mark signals from being carried to the central office in the event more than one signal in the high band or more than one signal in the low band are received.

Figure 3:
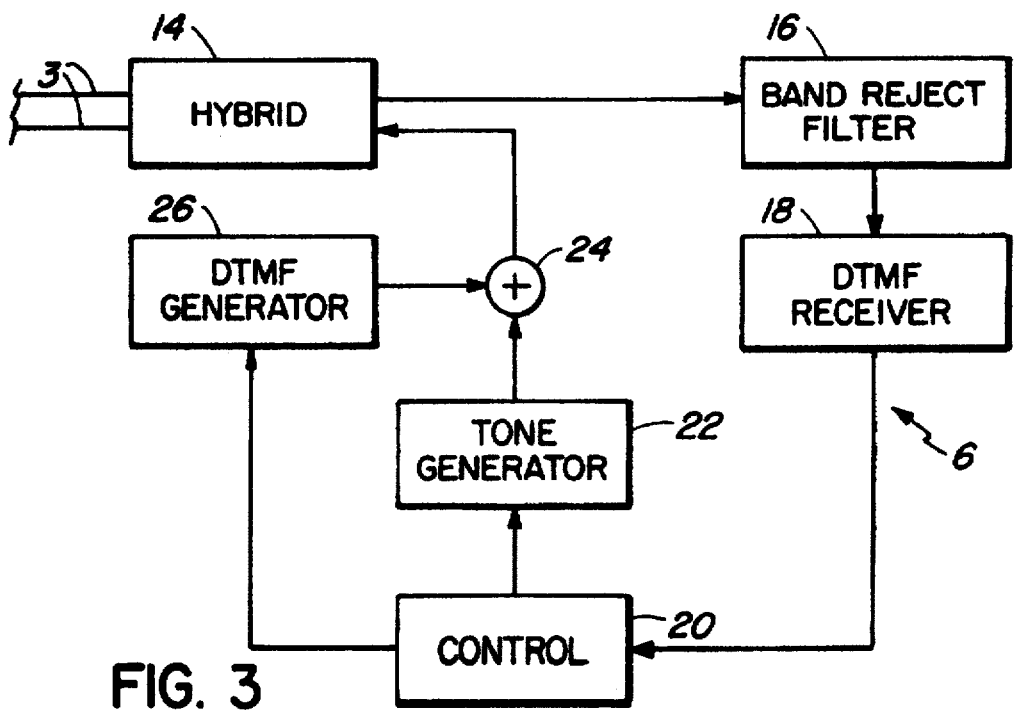
FIG. 3 is a block diagram of a dialer forming an embodiment of the invention.

Now with reference to FIG. 3, a dialed DTMF signal is carried by the subscriber's line from the telephone set to both the central office and to the dialer, it enters a hybrid 14 in the dialer. The DTMF signal passes through a band reject filter 16 (to be described in more detail below), and is received by a DTMF receiver 18. The receiver detects which of the tones are present in each digit, converts it to a digital signal in response transmits the digital signal to a controller Controller 20, which can be comprised of a microprocessor and associated program and data memories, receives and stores the digital signal. Controller 20 as a result outputs a control signal to tone generator 22.

In response, tone generator 22 generates a third tone signal, which passes through adder 24 and is applied to an input of hybrid 14. The third tone signal is applied via the hybrid to the subscriber's line 3 which simultaneously is carrying the DTMF signal.

All three signals, the two forming the DTMF signal and the third tone signal are carried by the subscriber's line to the central office. At the central office the DTMF signal is rejected as not being valid in the manner described earlier, due to the presence of the third signal.

It will be recognized that since the third signal is applied to the subscriber's line via the hybrid, it is also applied at the input to filter 16. Filter 16 should be designed to block that third tone, while allowing the tones forming a valid DTMF signal pass. Valid DTMF signals are contained between 686.5 Hz and 1499.2 Hz, and if the fourth high band signal of 1633 Hz is used, the filter could be a bandstop filter which stops frequencies between about 1608.5 Hz and 1657.5 Hz to a sufficient level to prevent rejection of the DTMF receiver. The filter could alternatively be a low pass filter. The filter gain/loss could be e.g. −29 dB relative to the lowest passband response in the high frequency band, in the presence of a 0 dBm third signal amplitude and a worst case third tone ratio of −16 dB. Such a filter could be implemented in any well known continuous time analog filter topologies, such as elliptical low pass, Chebychev low pass, Butterworth low pass or elliptical notch. The filter could alternatively be implemented using sampled data techniques such as switched capacitor filters, digital signal processing transversal filters, digital signal processing feedback filters or digital signal processing transform based filters.

Filtering could alternatively be not required if the DTMF receiver were implemented so that the third signal is ignored. Such a DTMF receiver could be comprised of a plurality of bandpass filters, one for each of the four low band tones and one for each of the three high band tones, with a decision circuit at the output of each of the filters, along with well known decoding and debouncing circuitry. The fourth high band tone, being the third signal, would thereby be ignored.

It was earlier noted that a DTMF signal is received by the DTMF receiver 18, is converted to digital form, and is passed to control 20. In addition to enabling the tone generator 22, the control 20 also stores the digital signal, or a representation thereof, and compares the stored signal with predetermined sequences (which can be as few a single digit). Once a sequence has been recognized, a control sequence stored in the control 20 memory is designated, and the control sequence is applied to a DTMF generator 26. The DTMF generator 26 is thus caused to output DTMF signals designated by the control sequence. These DTMF signal are applied through adder 24 to hybrid 14 from which they are applied to the subscriber's line 3. While they are also received through the filter 16 and receiver 18, this can be recognized by the control 20 merely as feedback and confirmation that the correct DTMF signals have been generated.

It should be noted that it is not necessary to utilize a separate tone generator 22. The DTMF generator 26 can receive the control signal from control 20 which would otherwise be applied to tone generator 22 and as a result output a preferably high tone signal of 1633 Hz, or some other single frequency third signal. In that case both tone generator 22 and adder 24 can be deleted, and the output of the DTMF generator 26 applied to the input of hybrid 14 in place of the output of adder 24.

It will be recognized that the DTMF signal received from the telephone set and stored in digital form by control 20 can designate a particular signal routing. Once stored, this routing (or the signals designating the routing) can be analyzed by the control 20, and the control sequence applied to DTMF generator 26 can cause generation of an entirely different sequence of DTMF signals. This can be comprised of more digits, fewer digits, substitute digits, similar digits, etc. of those originally dialed. For example, the control may analyze the destination of a call from the dialed DTMF digits and perform a least cost routing analysis based on how many calls (or their timing) to a particular destination have been made during a given period, or how many calls (or their timing) have been made through a particular long distance lines supplier have been made during discount plans have, or what discount plans have been offered by various long distance lines suppliers, or plural of the above, and a result, choose different routes to route a particular call at any particular time. This could not previously be performed by parallel dialers, since the central office could not ignore digits dialed by a subscriber.

It will be recognized that while a 1633 Hz high band tone has been described as the preferred third signal, any frequency signal can be utilized, as long as it will cause the central office to regard the DTMF signal with the third signal as invalid, and ignore the DTMF signal. The central office can detect the presence of only the third signal with recognition that it is an invalid or interfering frequency, or can detect the presence of three signals, at least two of which are in the valid DTMF frequency bands, in order to determine that the DTMF signal should be ignored or otherwise inhibited from being decoded or otherwise processed by the central office.

A person understanding this invention may now conceive of alternative structures and embodiments or variations of the above. All of those which fall within the scope of the claims appended hereto are considered to be part of the present invention.

We claim:

1. A method of dialing digits using dual tone multifrequency (DTMF) signals comprising:

(a) generating a digit from a DTMF generator being comprised of a first pair of signals forming a DTMF signal, one signal of said first pair of signals being in a low frequency band and one signal of said first pair of signals being in a high frequency band, and applying the DTMF signal to a telephone line connected to a central office, (b) detecting said first pair of signals in an auxiliary circuit and immediately applying a third signal which is a valid DTMF signal in either of the low or high bands to the telephone line at the same time as said first pair of signals, and (c) detecting the presence of said first pair of signals and the third signal at the central office and preventing processing of the DTMF signal at the central office as a result thereof.

2. A method as defined in claim 1 including generating a second pair of signals as a second DTMF signal in the auxiliary circuit in response to detection of the first pair of signals, applying the second DTMF signal to the telephone line, receiving the second DTMF signal by the central office, and processing the second DTMF signal by the central office.

3. A method as defined in claim 2 further including generating plural pairs of signals in sequence forming plural sequential DTMF signals, detecting each of said plural pairs of signals in said auxiliary circuit and immediately applying said third signal in either of the low or high band to the telephone line at the same time as each of said plural pairs of signals whereby decoding thereof at the central office is prevented, and subsequently generating a substitute sequence of DTMF signals in the auxiliary circuit and applying the substitute sequence to the telephone line for reception and decoding by the central office.

4. A method as defined in claim 3 in which none of the plural pairs of signals and substitute sequence of DTMF signals are at about the frequency of the third signal.

5. A method as defined in claim 2 in which none of the first and second pairs of signals are at about the frequency of the third signal.

6. A method as defined in claim 5 in which the third signal has a frequency of about 1633 Hz and is contained in the high band.

7. A method as defined in claim 2 in which the first pair of signals is generated in a DTMF generator connected to a telephone set keypad as a result of manual depression of a key of the keypad.

8. A method of dialing digits in a dialer comprising receiving first DTMF signals from a telephone line, generating a further DTMF signal which is a valid DTMF signal and applying it simultaneously with the first DTMF signals to the telephone line, and subsequently generating and applying a substitute DTMF signal sequence to the telephone line.

9. A method as defined in claim 8 including inhibiting decoding of the first DTMF signals at a telephone switching office connected to the telephone line, but decoding the substitute DTMF signal sequence and processing a call in accordance therewith.

* * * * *